(No Model.) 3 Sheets—Sheet 2.

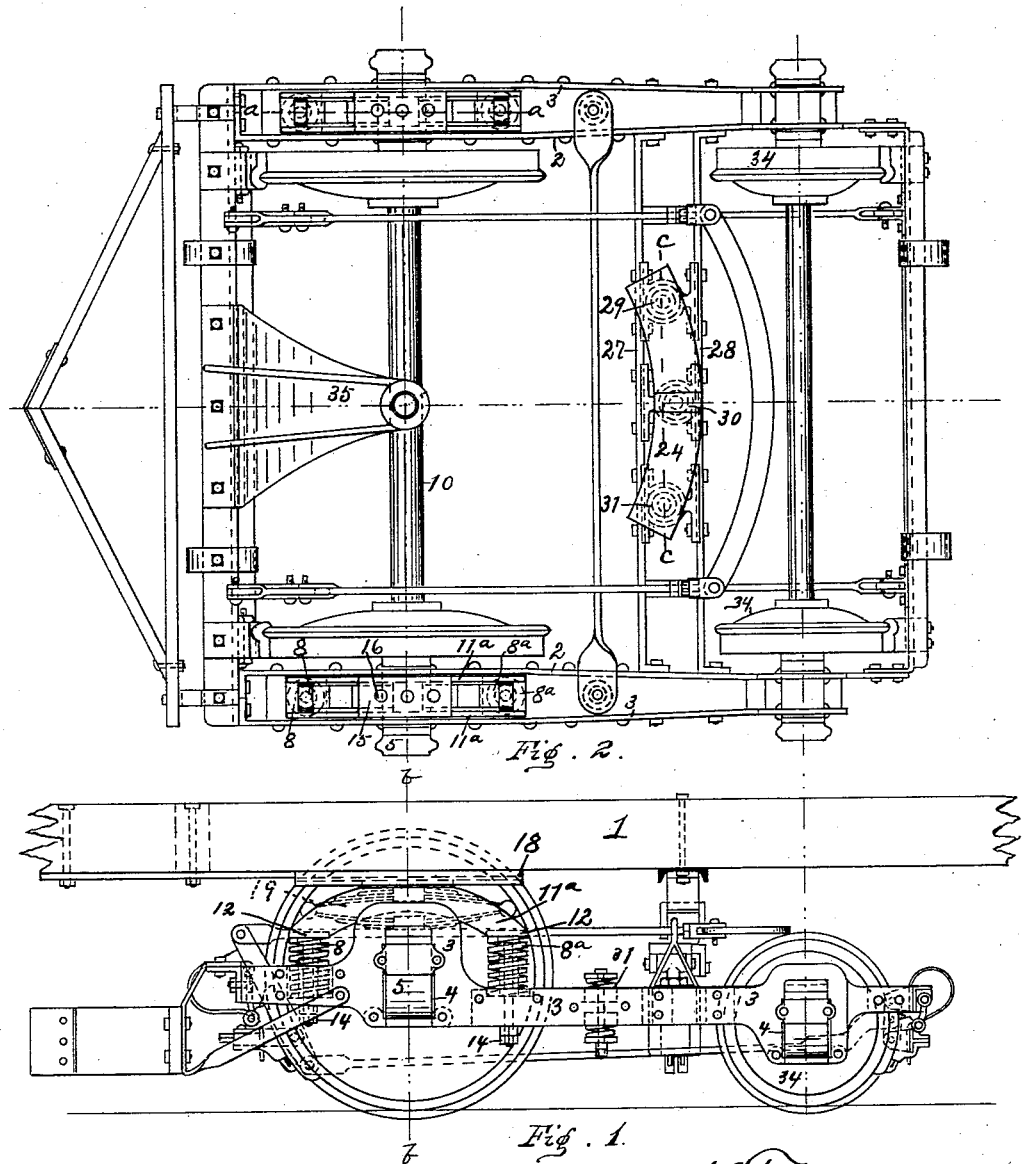

H. TESSEYMAN.
CAR TRUCK.

No. 564,904. Patented July 28, 1896.

WITNESSES:
J. Longenecker
L. Parrott

INVENTOR,
H. Tesseyman
BY R. J. McCarty
ATTORNEY.

THE NORRIS PETERS CO., PHOTO-LITHO., WASHINGTON, D. C.

(No Model.) 3 Sheets—Sheet 3.

H. TESSEYMAN.
CAR TRUCK.

No. 564,904. Patented July 28, 1896.

WITNESSES:
C. I. Longenecker
L. Parrott

H. Tesseyman,
INVENTOR,
BY R. J. McCarty,
ATTORNEY.

THE NORRIS PETERS CO., PHOTO-LITHO., WASHINGTON, D. C.

UNITED STATES PATENT OFFICE.

HENRY TESSEYMAN, OF DAYTON, OHIO.

CAR-TRUCK.

SPECIFICATION forming part of Letters Patent No. 564,904, dated July 28, 1896.

Application filed October 25, 1895. Serial No. 566,837. (No model.)

*To all whom it may concern:*

Be it known that I, HENRY TESSEYMAN, of Dayton, county of Montgomery, State of Ohio, have invented a new and useful Improvement in Car-Trucks; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in car-trucks, more particularly to street or motor car trucks.

The invention has for its object to provide means whereby the weight of the car is equally borne on each side of the truck, and easy and uniform movements are imparted thereto under a uniform contraction and expansion of the springs.

A further object of the said invention is to provide means for controlling the smaller or guide wheels, whereby they are prevented from rising out of the groove on the inner side of the track while the truck is turning a curve.

A still further object of the invention is to provide a connection between the truck and the body of the car that permits said truck to freely yield to the various inclinations and curves of the track.

To these ends the invention has reference to parts and their arrangement, that will be fully disclosed in the following specification, taken in connection with the accompanying drawings, of which—

Figures 10, 11, 12:
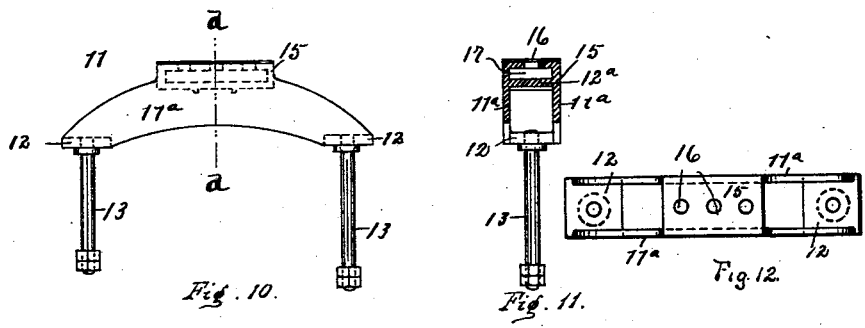
Figure 5:
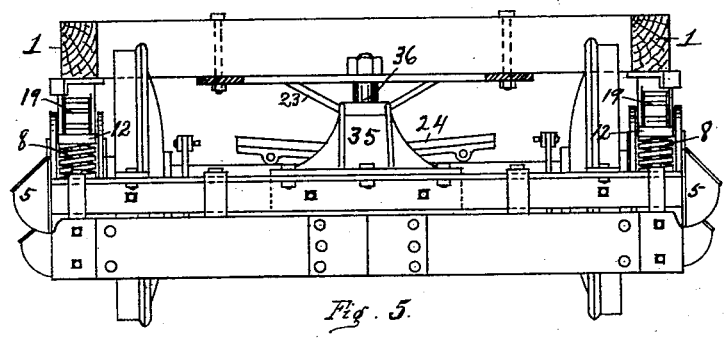
Figure 4:
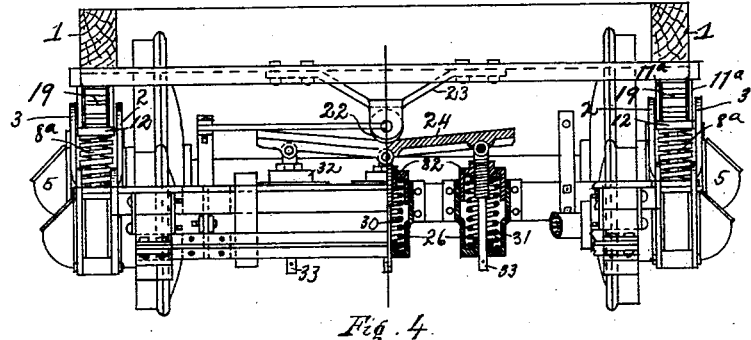
Figure 3:
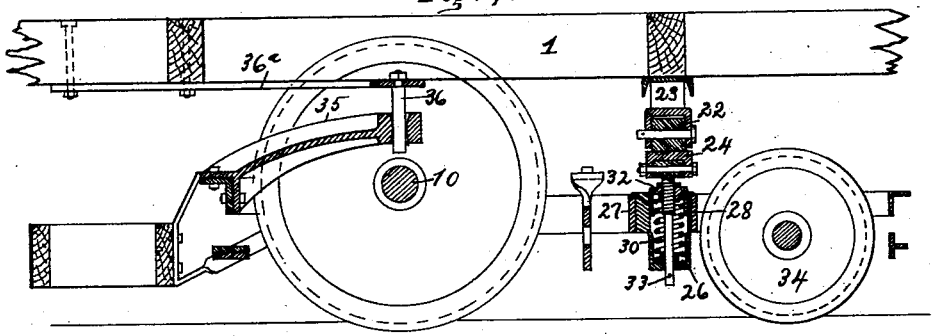
Figure 8:
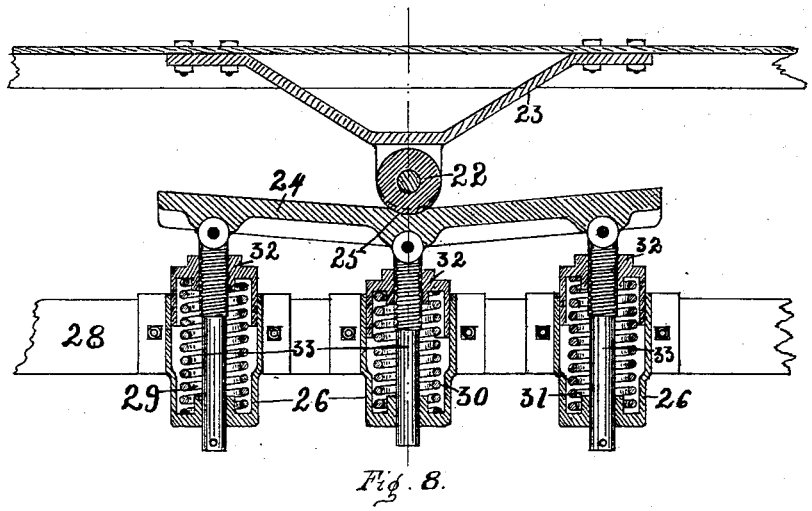
Figure 6:
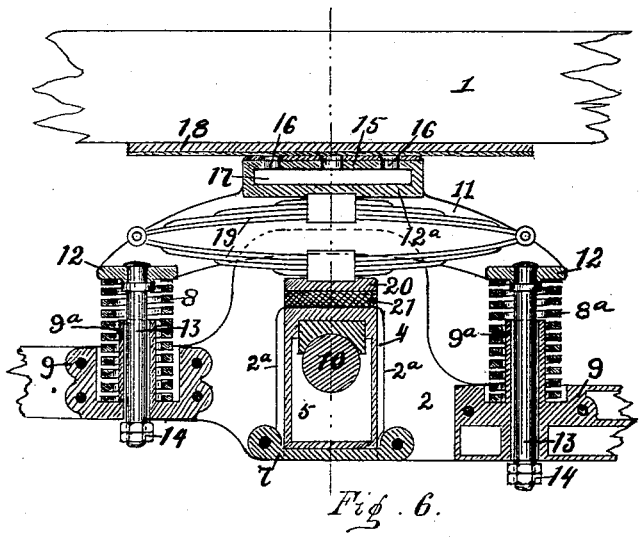
Figure 7:
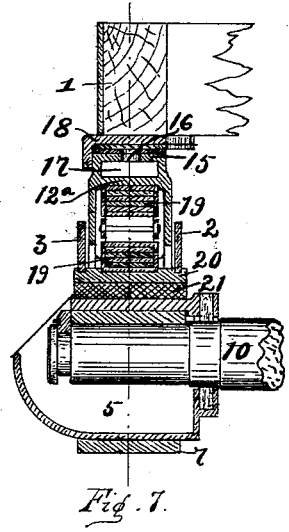
Figure 9:
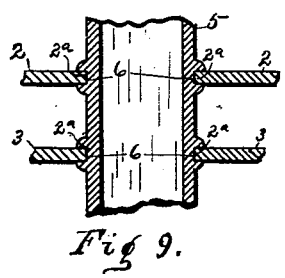

Figure 1 is a side elevation of a truck containing my improvements. Fig. 2 is a plan view of the same. Fig. 3 is a section through the longitudinal center of Fig. 2. Fig. 4 is a rear end elevation, partly in section. Fig. 5 is a front end elevation. Fig. 6 is a sectional view through one of the journal-boxes on the line $a\ a$ of Fig. 2. Fig. 7 is a sectional view through one of the journal-boxes on the line $b\ b$ of Fig. 1. Fig. 8 is an enlarged sectional view through the weight-shifting mechanism on the line $c\ c$ of Fig. 2. Fig. 9 is a horizontal section through one of the journal-boxes and the side plates adjacent thereto. Fig. 10 is a detached side elevation of one of the weight-equalizing bars. Fig. 11 is a section on the line $d\ d$ of Fig. 10. Fig. 12 is a detached plan view of one of the weight-equalizing bars.

In the following detailed description similar reference-characters indicate corresponding parts in the several views.

As the bearings on each side of the truck are identically the same, reference will be confined mainly to one side.

1 designates the horizontal or side sills, upon which the body of the car is mounted.

2 and 3 are the inner and outer side plates of the truck-frame, which are provided with openings 4 to receive journal-boxes 5. The vertical edges $2^a$ of said plates fit in grooves 6 in the sides of the journal-boxes, as shown in Fig. 9, and the said boxes are secured in position by clamps 7, that are bolted to the side plates 2 and 3, as shown in Fig. 6.

8 and $8^a$ designate helical springs seated in supports 9 9, that are securely mounted between the side plates 2 and 3 equidistant from the axle 10 of the traction-wheels. The supports 9 9 have integral tubular stems $9^a$, that project into the centers of said springs.

11, Fig. 10, designates a weight-equalizing bar, of which there is one on each side of the truck. These bars consist each of two side plates $11^a\ 11^a$, substantially of the curvature shown in Fig. 10, and between the ends of which there are integral plates or flanges 12 12, that inclose and bear upon the upper ends of the springs 8 $8^a$ and are maintained in contact with said springs by means of bolts 13, that penetrate the said flanges 12 12 and stems $9^a$, and are tightened by nuts 14. 15 designates an integral plate or enlarged portion intervening between the middle portions of said plates $11^a\ 11^a$ and providing an oil-chamber 17, with openings 16 leading thereto. The upper surface of the plate 15 is flat in order to provide an even surface for the plates 18 to slide upon. The plates 18 are attached to the lower side of the sills 1 1.

19 designates a laminated or elliptic spring, which is securely inclosed between the lower surface $12^a$ of the weight-equalizing bars and a supporting-plate 20, that rests upon a rubber cushion 21, secured on the upper side of each of the journal-boxes.

The construction of the weight-equalizing bars as described in the foregoing is deemed preferable; but of course it is apparent that some variation therefrom may be made without departing from the invention.

It will be seen in Fig. 6 that the helical springs 8 and 8ª and the elliptic spring 19 are mounted wholly free and independent of each other, and that all of said springs are subjected to an equal amount of pressure under the weight-equalizing bar 11, due to the weight and motion of the car. The result is the car is not subjected to sudden jerks or thrusts, but an easy, regular, and uniform movement is had, which cannot be obtained from either the helical springs or the elliptic springs alone, owing to the greater resiliency or sensitiveness of the former and the less sensitive nature of the latter. In the association of these two different forms of springs in the manner described, both subject to the same pressure and both being free from any connection with each other and adapted to perform a unitary function, the car is compelled to ride freely. The slower movement of the elliptic spring counteracts or retards that of the helical springs, while the quicker movement of the latter springs accelerates the movement of the elliptic spring, and thus a desirable medium is produced.

22 designates a roller mounted in a bracket 23, rigidly attached to the body of the car. This roller rotates on an arc-plate 24, which is curved substantially as is shown in Figs. 2 and 8, and its upper concaved side is provided with a central depression 25, in which the roller 22 rests when the car is running on a straight track.

26 designates cases or spring-seats which are rigidly attached to cross-bars 27 and 28 of the truck-frame, and in which there are seated helical springs 29 30 31.

32 are compression-caps that fit in the cases 26 and inclose the upper ends of said springs.

33 are T-headed guide-bolts which are flexibly connected to the arc-plate 24. These bolts pass through said springs, project through the bottom of the cases, and have their upper ends screw-threaded to engage with threads on the caps 32, whereby the springs may be adjusted when necessary. For example, when the track is uneven or the curves worn, a greater amount of compression may be required to control the guide-wheels. This is obtained by screwing the caps 32 downward.

In the positions of the roller and plate shown in Fig. 8 the weight is distributed equally between the three springs. As the truck enters a curve in the track, the relative positions of the plate 24 and the roller 22 change. The ends of said plate or the portion on either side of the center is brought in contact with said roller. This causes the higher surface of the plate to come in contact with the roller, and thereby increases the compression of the center spring and the end spring on the inner side of the curve, relieving the outer end spring of an amount of pressure or weight in proportion to the amount that is transferred to said inner spring. A greater weight is thus placed upon the inner guide-wheel 34. The transfer of this excess of weight to the guide-wheel which is then making the shortest turn or curve, causes said wheel to hug the track, thereby preventing it from mounting the guard-rail.

A swivel connection is made between the body of the car and the truck, comprising a curved arm or plate 35, which is rigidly attached to the front angle-bar of the truck-frame. The inner end of said arm is reduced in diameter, as shown in Fig. 2, and has a flaring opening 35ª, as shown in Fig. 3, to enable it to swivel freely on its pivot, consisting of a king-bolt 36, which is rigidly attached to a plate 36ª. The latter plate is rigidly attached to the body of the car. It will be observed in Figs. 2 and 3 that this pivotal connection between the body of the car and the truck is above the center of the axle of the traction-wheels.

Having fully described my invention, I claim as new and desire to secure by Letters Patent—

1. In a car-truck, weight-equalizing bars, in combination with a laminated spring inclosed between the middle portion of each of said bars and a respective journal-box, helical springs mounted on the side plates of the truck-frame, one of said helical springs being on each side of a journal-box and the upper ends of said helical springs being inclosed by the ends of the said weight-equalizing bars, whereby means are provided for uniformly distributing the weight of a car to said laminated and helical springs, and thence to the journal-boxes and the truck-frame, substantially as described.

2. In a car-truck, weight-equalizing bars each of which is provided with an enlarged central portion having an oil-chamber therein, and integral plates or flanges at their ends, in combination with an elliptic spring inclosed between the central part of each of said weight-equalizing bars and a respective journal-box, a helical spring mounted on the truck-frame on each side of the journal-boxes, said elliptical and helical springs adapted to be compressed simultaneously by said weight-equalizing bars, substantially as and for the purposes specified.

3. In a car-truck, the combination with the side plates of the truck-frame, and the journal-boxes, of a weight-equalizing bar on each side of the truck, the ends of which terminate in flanges, and the central part of which is enlarged, a full elliptic spring inclosed between said enlarged part, and a respective journal-box, helical springs mounted between the side plates equidistant from a journal-box, the said helical springs being inclosed by the flanged ends of said equalizing-bars, the said helical springs, and the elliptic springs being disconnected and free from contact with each other so that the weight of the car is primarily distributed alike to each character of spring, substantially as and for the purposes specified.

4. In a car-truck, the combination of helical springs mounted on cross-bars of the truck-frame, an arc-plate substantially as described, mounted on said springs, and a roller mounted on the body of a car and normally in contact with said arc-plate, whereby means are provided for increasing the weight upon the inner guide-wheel when the truck is passing around a curve, substantially as and for the purposes specified.

5. The combination with a roller mounted on the body of a car, of a compression-plate upon which said roller normally rests, the said plate having its upper side concaved, and a depression in the center thereof in which said roller fits, helical springs mounted on the truck-frame, guide-bolts flexibly connected to said compression-plate and penetrating said springs, and compression-caps inclosing said springs and having an adjustable attachment with said guide-bolts, whereby means are provided for transferring a preponderance of weight on the inner guide-wheel as the truck passes around a curve, substantially as and for the purposes specified.

6. In a car-truck, the combination of a series of spring-seats provided each with an opening in its bottom, said seats mounted in the rear of the main axle, a series of helical springs mounted in said seats, an arc-plate mounted above said springs, said plate having its upper side concaved and a depression in the center thereof, a series of guide-bolts flexibly connected to said arc-plate and projecting through said springs and their seats, and an antifriction-roller mounted on the body of the car, and adapted to transfer an excess of weight to one or the other of the outer springs, substantially as and for the purposes specified.

7. The combination with the body of a car, of a truck provided with curved equalizing-bars, an elliptic spring inclosed between each of said bars and a journal-box, helical springs mounted between the side plates of the truck-frame, and inclosed by the ends of said equalizing-bars, three helical springs mounted in the rear center of said truck, an arc-plate, guide-bolts flexibly connected to said arc-plate and penetrating said springs, a cap inclosing each of said springs and attached to each of said guide-bolts, and a roller mounted on the body of the car adapted to bear on said arc-plate, all arranged substantially as and for the purposes specified.

In testimony whereof I have hereunto set my hand this 21st day of October, 1895.

HENRY TESSEYMAN.

Witnesses:
R. J. McCarty,
Charles W. Dale.